US007680956B2

(12) United States Patent
Volz et al.

(10) Patent No.: US 7,680,956 B2
(45) Date of Patent: Mar. 16, 2010

(54) COMMUNICATING ADDITIONAL INFORMATION IN A DNS UPDATE RESPONSE BY REQUESTING DELETION OF A SPECIFIC RECORD

(75) Inventors: Bernard Volz, Center Harbor, NH (US); Sri Hary Vengadasubbu, Arlington, MA (US); Jeffrey Cioli, Derry, NH (US)

(73) Assignee: Cisco Technology, Inc., San Jose, CA (US)

( * ) Notice: Subject to any disclaimer, the term of this patent is extended or adjusted under 35 U.S.C. 154(b) by 216 days.

(21) Appl. No.: 11/585,560

(22) Filed: Oct. 24, 2006

(65) Prior Publication Data
US 2008/0098084 A1    Apr. 24, 2008

(51) Int. Cl.
*G06F 15/16* (2006.01)
*G06F 15/177* (2006.01)
*G06F 9/24* (2006.01)
*G01R 31/08* (2006.01)
*H04J 1/16* (2006.01)
*H04J 3/14* (2006.01)
*G06F 15/173* (2006.01)
*G06F 11/00* (2006.01)
*G06F 15/00* (2006.01)
*G06F 9/00* (2006.01)
*H04L 1/00* (2006.01)
*H04L 12/26* (2006.01)
*H04L 12/28* (2006.01)
*H04L 12/56* (2006.01)

(52) U.S. Cl. .................... 709/245; 709/208; 709/220; 709/227; 714/15; 713/1; 370/219; 370/244; 370/254; 370/395.54

(58) Field of Classification Search ................ 709/203, 709/208, 218, 220, 223, 227, 245, 249; 714/13, 714/15; 370/219, 220, 244, 254, 395.54; 713/1
See application file for complete search history.

(56) References Cited

U.S. PATENT DOCUMENTS 5,968,121 A * 10/1999 Logan et al. ................ 709/219
6,411,966 B1 * 6/2002 Kwan et al. ................ 707/201
6,681,228 B2 * 1/2004 Balogh ........................ 707/10
6,701,329 B1 * 3/2004 Esibov et al. .............. 707/201

(Continued)

OTHER PUBLICATIONS

Vixie, P. et al. "Dynamic Updates in the Domain Name System (DNS Update)," RFC 2136, Apr. 1997, pp. 1-26.*

(Continued)

*Primary Examiner*—Larry D Donaghue
*Assistant Examiner*—Melvin H Pollack
(74) *Attorney, Agent, or Firm*—BainwoodHuang (57) ABSTRACT

A technique is performed within a DNS server to respond to a DNS message. The technique includes receiving the DNS message from a requesting device (e.g., a DHCP server), and generating a search result based on a search of a portion of the DNS message for a request to delete a specific record (i.e., a specific, predefined record which is not expected to exist in the DNS). The technique further includes selectively providing and not providing current state information (or other information) to the requesting device depending on whether the search result indicates that the request to delete the specific record resides within the portion of the DNS message. Such operation allows for augmented operation with augmented DNS clients, as well as non-augmented operation with legacy equipment.

20 Claims, 5 Drawing Sheets

U.S. PATENT DOCUMENTS

| | | | |
|---|---|---|---|
| 6,769,031 B1 * | 7/2004 | Bero | 709/245 |
| 6,779,004 B1 * | 8/2004 | Zintel | 709/227 |
| 6,834,302 B1 * | 12/2004 | Harvell | 709/224 |
| 6,895,431 B1 * | 5/2005 | Bero | 709/220 |
| 6,976,090 B2 * | 12/2005 | Ben-Shaul et al. | 709/246 |
| 7,027,582 B2 * | 4/2006 | Khello et al. | 379/220.01 |
| 7,069,323 B2 | 6/2006 | Gardos et al. | |
| 7,072,982 B2 * | 7/2006 | Teodosiu et al. | 709/245 |
| 7,085,814 B1 * | 8/2006 | Gandhi et al. | 709/208 |
| 7,120,929 B2 | 10/2006 | Beattie et al. | |
| 7,152,118 B2 * | 12/2006 | Anderson et al. | 709/245 |
| 7,203,682 B2 * | 4/2007 | Balogh | 707/8 |
| 7,243,142 B2 * | 7/2007 | Poirot et al. | 709/220 |
| 7,254,626 B1 | 8/2007 | Kommula et al. | |
| 7,257,631 B2 | 8/2007 | Gardos et al. | |
| 7,308,579 B2 * | 12/2007 | Abela | 713/182 |
| 7,334,049 B1 * | 2/2008 | Somasundaram et al. | 709/245 |
| 7,343,485 B1 * | 3/2008 | Huang et al. | 713/153 |
| 7,356,031 B1 * | 4/2008 | Toebes et al. | 370/392 |
| 2002/0083206 A1 * | 6/2002 | Volpano | 709/249 |
| 2003/0026230 A1 * | 2/2003 | Ibanez et al. | 370/338 |
| 2003/0145073 A1 * | 7/2003 | Lee | 709/223 |
| 2004/0073707 A1 * | 4/2004 | Dillon | 709/245 |
| 2004/0083306 A1 * | 4/2004 | Gloe | 709/245 |
| 2005/0289240 A1 * | 12/2005 | Cheshire et al. | 709/242 |
| 2006/0092861 A1 * | 5/2006 | Corday et al. | 370/256 |
| 2006/0146870 A1 * | 7/2006 | Harvey et al. | 370/466 |
| 2006/0242260 A1 * | 10/2006 | Sakou | 709/217 |
| 2008/0062997 A1 * | 3/2008 | Nix | 370/395.2 |
| 2008/0086574 A1 * | 4/2008 | Raciborski et al. | 709/245 |
| 2008/0320111 A1 * | 12/2008 | Yan et al. | 709/220 |

OTHER PUBLICATIONS

Stapp, M. et al. "The Dynamic Host Configuration Protocol (DHCP) Client Fully Qualified Domain Name (FQDN) Option," RFC 4702, Oct. 2006, pp. 1-17.*

Jeong, J. "IPv6 Host Configuration of DNS Server Information Approaches," RFC 4339, Feb. 2006, pp. 1-26.*

Droms, R. "DNS Configuration Options for Dynamic Host Configuration Protocol for IPv6 (DHCPv6)," RFC 3646, Dec. 2003, pp. 1-7.*

Aboba, B. and Cheshire, S. "Dynamic Host Configuration Protocol (DHCP) Domain Search Option," RFC 3397, Nov. 2002, pp. 1-8.*

Hardie, T. "Distributing Authoritative Name Servers via Shared Unicast Addresses," RFC 3258, Apr. 2002, pp. 1-11.*

Elz, R. et al. "Selection and Operation of Secondary DNS Servers," RFC 2182, Jul. 1997, pp. 1-12.*

Ramasubramanian, Venugopalan and Sirer, Emin Gun. "The Design and Implementation of a Next Generation Name Service of the Internet," Proceedings of the 2004 Conference on Applications, Technologies, Architectures, and Protocols for Computer Communications, 2004, pp. 331-342.*

Cachin, C. and Samar, A. "Secure Distributed DNS," 2004 International Conference on Dependable Systems and Networks, Jul. 1, 2004, pp. 423-432.*

Kangasharju, Jussi and Ross, Keith W. "Locating Copies of Objects Using the Domain Name System," 4th International Caching Workshop, 1999, pp. 1-12.*

Huck, Paul E., Jr. "Zero Configuration Name Services for IP Networks," Masters Thesis, Department of Electrical Engineering and Computer Science, Massachussetts Institute of Technology, Jun. 2001, pp. 1-78.*

* cited by examiner

COMMUNICATING ADDITIONAL INFORMATION IN A DNS UPDATE RESPONSE BY REQUESTING DELETION OF A SPECIFIC RECORD

TECHNICAL FIELD

The present disclosure relates generally to data communications. More particularly, the present disclosure relates to the Domain Name System (DNS).

BACKGROUND

In general, the DNS enables translation of domain names to Internet Protocol (IP) addresses. Such translation makes it possible to attach easy-to-remember domain names (e.g., "domainname.org") to difficult-to-remember IP addresses (e.g., "200.140.130.120"). A detailed description of conventional DNS is provided in a document entitled "RFC 1035—DOMAIN NAMES_IMPLEMENTATION AND SPECIFICATION", by P. Mockapetris, November 1987, the teachings of which are hereby incorporated by reference in their entirety.

With the Dynamic Host Configuration Protocol (DHCP), DHCP client computers obtain dynamically assigned IP addresses from DHCP servers. Such dynamically assigned IP addresses are valid for specific amounts of time (i.e., lease times). If a DHCP client computer is unable to renew its IP address lease or if the DHCP client computer moves to a different subnet, the DHCP client computer must acquire a new IP address.

In order to keep DNS current in a DHCP environment, DNS client computers (e.g., DHCP servers) typically register and dynamically update their resource records (RRs) with authoritative DNS name servers whenever a change to an IP address or a name occurs. Such operation reduces the manual administration burden of zone records, i.e., master files which are managed by the authoritative DNS name servers. A detailed description of the conventional DNS update process is provided in a document entitled "RFC 2136—DYNAMIC UPDATES IN THE DOMAIN NAME SYSTEM (DNS UPDATE)", by P. Vixie et. al., April 1997, the teachings of which are hereby incorporated by reference in their entirety.

One conventional authoritative DNS name server implementation (hereinafter referred to as the "general DNS name server approach") employs primary authoritative DNS name servers for maintaining a master zone file. In particular, an active primary authoritative DNS name server controls an authoritative version of the master zone file. A backup primary authoritative DNS name server maintains a backup copy of the master zone file.

During normal operation, the active primary authoritative DNS name server is capable of (i) fulfilling requests for DNS information (i.e., DNS queries) as well as (ii) processing dynamic DNS updates to the master zone file (i.e., DNS messages configured to change RRs in the master zone file). Since the backup primary authoritative DNS name server merely maintains a backup copy of the master zone file, the backup primary authoritative DNS name server is capable of fulfilling requests for DNS information for load balancing purposes. However, the backup primary authoritative DNS name server cannot process dynamic DNS updates while the active primary authoritative DNS name server is available. Otherwise, the authoritative version of the master zone file managed by the active primary authoritative DNS name server would no longer match the backup copy of the master zone file managed by the backup primary authoritative DNS name server.

If the active primary authoritative DNS name server fails, the backup primary authoritative DNS name server then becomes capable of fulfilling requests for DNS information as well as processing dynamic DNS updates to the master zone file. That is, when the backup primary authoritative DNS name server detects a loss of the active primary authoritative DNS name server, the backup primary authoritative DNS name server becomes capable of making changes to the backup copy of the master zone file. Along these lines, if a DNS client sends a dynamic DNS update to the active primary authoritative DNS name server while the active primary authoritative DNS name server remains unavailable, the DNS client does not receive a response within a particular timeout period because the active primary authoritative DNS name server is unable to respond. After the DNS client waits for the time period to elapse, the DNS client sends the dynamic DNS update to the backup primary authoritative DNS name server which then processes the update. As a result, the updated backup copy of the master zone file then becomes the most current version of the master zone file.

When the active primary authoritative DNS name server is repaired and returns to operation, the active primary authoritative DNS name server synchronizes its authoritative version of the master zone file with the backup copy of the master zone file on the backup primary authoritative DNS name server. If a DNS client sends a dynamic DNS update to either the active primary authoritative DNS name server or the backup primary authoritative DNS name server during this synchronization process, the receiving authoritative DNS name server typically ignores the dynamic DNS update and thus the DNS client does not receive a response. Rather, the timeout period elapses and the DNS client re-tries (e.g., sends the dynamic DNS update to a different primary authoritative DNS name server, waits a predefined amount of time and re-sends the dynamic DNS update to the same primary authoritative DNS name server, etc.) until the dynamic DNS update is fulfilled.

Another conventional authoritative DNS name server implementation (hereinafter referred to as the "active directory" approach) employs multiple peer-level primary authoritative DNS name servers which can process dynamic DNS updates concurrently. That is, a first primary authoritative DNS name server can process a first dynamic DNS update while a second primary authoritative DNS name server processes a second dynamic DNS update. This "active directory" approach utilizes timestamps to coordinate DNS updates handled by the multiple primary authoritative DNS name servers.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Overview

Unfortunately, there are deficiencies to the above-described conventional approaches to responding to dynamic DNS updates. For example, in the above-described conventional general approach which employs an active primary authoritative DNS name server and a backup primary authoritative DNS name server, it may take a significant amount of time for each DNS client to converge to the particular authoritative DNS name server for processing dynamic DNS updates. That is, each DNS client typically waits for a timeout period to expire before re-sending a dynamic DNS update thus slowing down the process of determining which primary authoritative DNS name server is currently accepting updates. Moreover, if there are no primary authoritative DNS name servers currently available to respond to dynamic DNS updates (e.g., the primary authoritative DNS name servers are synchronizing), the DNS clients are unnecessarily consuming computer resources and adding unnecessary network traffic when periodically sending out dynamic DNS updates in an attempt to converge on a responsive authoritative DNS name server.

Furthermore, in connection with the above-described conventional active directory approach which utilizes timestamps to coordinate DNS updates handled by the multiple DNS servers, the handling dynamic DNS updates is not fool proof. That is, there may situations in which a first primary authoritative DNS name server has a first set of updates and a second primary authoritative DNS name server has a second set of updates but, before the first and second primary authoritative DNS name servers successfully merge the updates into a single master zone file, one of the two authoritative DNS servers fails. As a result, there is no master zone file which properly reflects all of the committed dynamic DNS updates and some of the updates will be lost.

In contrast to the above-described conventional approaches to processing dynamic DNS updates, embodiments of the invention are directed to techniques for responding to a DNS message from a requesting device which involve a request to delete a specific record (i.e., a predetermined unique record which is not expected to exist in the DNS). In particular, an augmented requesting device (e.g., an augmented DNS client) can send such a DNS message to a DNS server (e.g., a primary authoritative DNS name server) as a means of informing the DNS server that the requesting device is augmented with the ability to receive current state information from the DNS server. Upon detection of the request to delete the specific record within the DNS message, the DNS server can then respond with a variety of information, e.g., current state information such as an indication that the DNS server is the active primary authoritative DNS name server but is in the process of synchronizing, an indication that the DNS server is a backup primary authoritative DNS name server rather than the active primary authoritative DNS name server, and so on. Accordingly, the DNS server can inform the requesting device as to which DNS server is currently handling dynamic DNS updates thus enabling the requesting device to converge to the proper primary authoritative DNS name server quickly and efficiently. Moreover, such operation remains compliant with legacy devices, i.e., DNS messages that include the request to delete the specific record can be processed by a conventional DNS name server (e.g., a non-augmented primary authoritative DNS name server) without impacting the operation of that conventional DNS name server since conventional DNS name servers are typically configured to ignore such a request. Furthermore, any non-augmented DNS messages that do not include the request to delete the specific record can be processed by an augmented DNS server in a standard manner as well.

One embodiment is directed to a method which is performed within a DNS server to respond to a DNS message. The method includes receiving the DNS message from a requesting device (e.g., a DHCP server), and generating a search result based on a search of a portion of the DNS message for a request to delete a specific record. The method further includes selectively providing and not providing current state information (or other information) to the requesting device depending on whether the search result indicates that the request to delete the specific record resides within the portion of the DNS message. Such operation allows for augmented operation to accommodate augmented DNS clients, as well as non-augmented operation to accommodate legacy equipment.

DESCRIPTION OF EXAMPLE EMBODIMENTS

Figure 1:
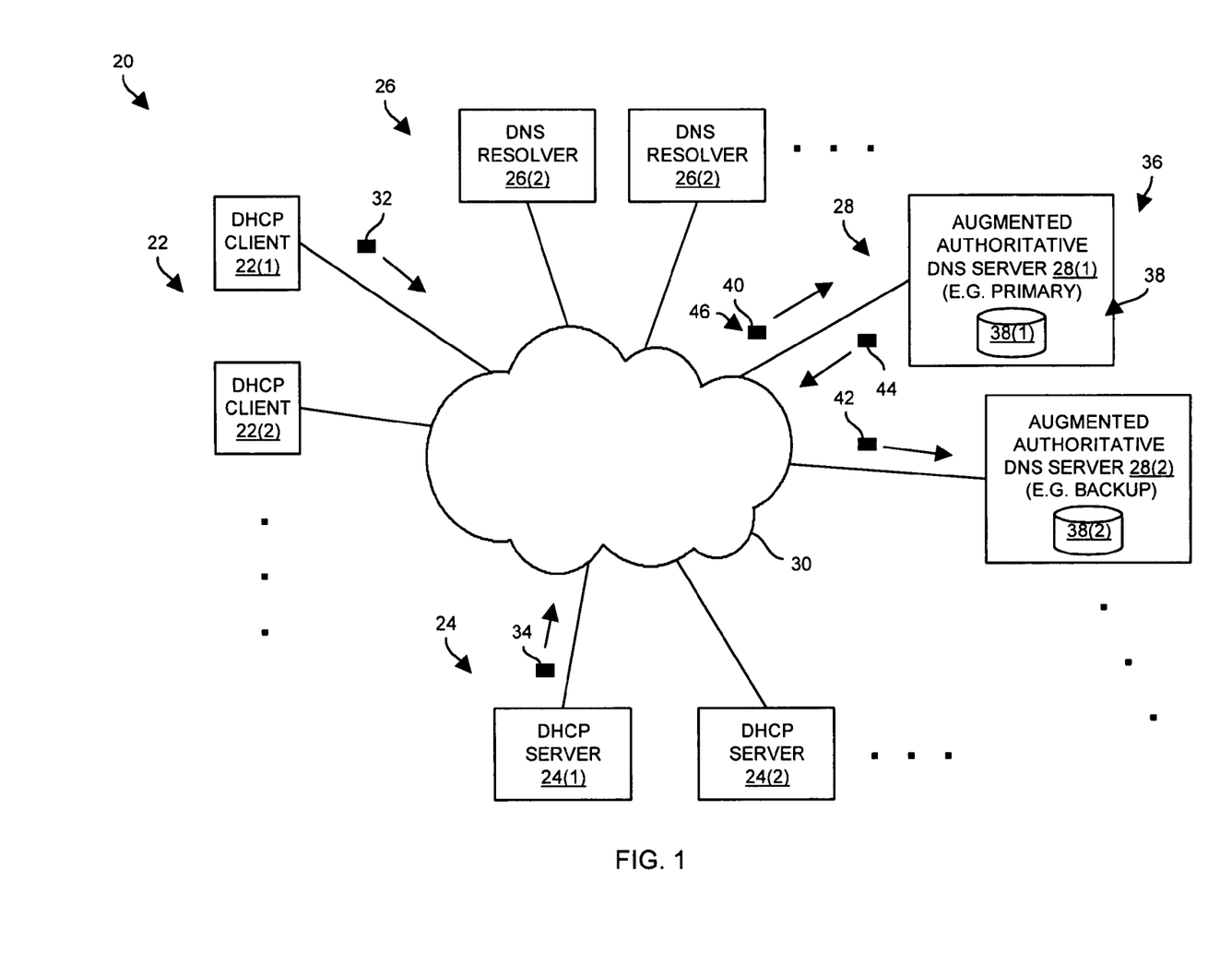
FIG. 1 is a block diagram of a system which is configured to process a DNS message having a request to delete a specific record.

FIG. 1 shows a system 20 which is configured to process a DNS message having a request to delete a specific record (i.e., a predetermined unique record which is not expected to exist in the DNS). The system 20 includes DHCP client devices 22(1), 22(2), . . . (collectively, DHCP clients 22), DHCP server devices 24(1), 24(2), . . . (collectively, DHCP servers 24), DNS resolving server devices 26(1), 26(2), . . . (collectively, DNS resolvers 26), and augmented primary authoritative DNS name server devices 28(1), 28(2), . . . (collectively, DNS name servers 28). The DHCP clients 22, the DHCP servers 24, the DNS resolvers 26 and the DNS name servers 28 as well as other devices are configured to communicate with each other through a communications fabric 30 (e.g., copper wire, fiber optic cable, wireless medium, related data communications devices and network components, combinations thereof, etc.).

It should be understood that other components (e.g., firewalls, routers, switches, bridges, gateways, etc.) can be considered to belong to the system 20 as well. Moreover, the system 20 is capable of extending across a variety of network topologies and configurations (e.g., LANs, WANs, the Internet, etc.).

During operation, the DHCP clients 22 are configured to provide DHCP client messages 32 (e.g., DHCPDISCOVER, DHCPREQUEST, etc.) to the DHCP servers 24, and the DHCP servers 24 are configured to respond to the DHCP client messages 32 with DHCP server messages 34 (e.g., DHCPOFFER, DHCPACK, etc.). As a result, the DHCP clients 22 obtain IP address assignments from the DHCP servers 24 in accordance with the DHCP standard. Furthermore, the DHCP servers 24 operate as DNS clients since the DHCP servers 24 update the DNS when providing the IP address assignments to the DHCP clients 22 (e.g., associating host names with addresses) and when leases expire (e.g., de-associating host names).

Additionally, the DNS resolvers 26 are configured to resolve domain (or host) names into IP addresses in response to client queries (e.g., from the DHCP clients 22). In the event that a DNS resolver 26 is unable to resolve a particular domain name into an IP address, the resolver 26 is capable of communicating with DNS servers (e.g., root servers, recursive DNS servers, etc.) through the communications fabric 30 to resolve the domain name. It should be understood that each DNS resolver 26 is capable of being a recursive DNS server.

Furthermore, the DNS name servers 28 operate as a fault redundant set 36 of primary authoritative DNS name servers to manage a set of zone files 38 (i.e., master files) for access by the DNS resolvers 26. Within the fault redundant set 36 of primary authoritative DNS name servers, there is one active primary authoritative DNS name server which is capable of processing dynamic DNS updates 40 (i.e., DNS messages configured to modify a zone file 38) from DNS clients such as the DHCP servers 24 as well as process DNS queries 42. Also, the fault redundant set 36 of DNS servers 28 includes at least one backup primary authoritative DNS name server with each backup primary authoritative DNS name server being capable of processing DNS queries 42, but not being capable of processing dynamic DNS updates 40 unless there is a failure of the active primary authoritative DNS name server.

By way of example in connection with FIG. 1, the DNS name server 28(1) currently operates as the active primary authoritative DNS name server and thus manages an authoritative version 38(1) of a master file. In contrast, the DNS name server 28(2) currently operates as a backup primary authoritative DNS name server and manages a backup copy 38(2) of the master file. When the DNS name server 28(1) receives a dynamic DNS update 40 from a DNS client, the DNS name server 28(1) waits until it both (i) completes a DNS update operation on the version 38(1) of the master file and (ii) confirms that the DNS name server 28(2) has also completed a DNS update operation on the backup copy 38(2) before outputting a signal 44 indicating successful completion of the dynamic DNS update 40. Handling of dynamic DNS updates 40 in such an atomic manner enables the fault redundant set 36 of primary authoritative DNS name servers to guarantee that both copies 38(1), 38(2) of the master file (collectively, master file copies 38) include the same information.

At this point, it should be understood that the DNS name servers 28 are augmented with the ability to detect the existence of augmented DNS clients. In particular, each DNS name server 28 is capable of inspecting dynamic DNS updates 40 for a request 46 to delete a specific record (illustrated by the arrow 46 pointing to the dynamic DNS update 40 in FIG. 1). If such a request 46 exists within a particular dynamic DNS update 40, the DNS name server 28 receiving that dynamic DNS update 40 knows that the DNS client that issued that update 40 is an augmented DNS client. Once the DNS name server 28 knows that the DNS client is augmented, the DNS name server 28 can send enhanced communications to that DNS client (e.g., the current operational status of the DNS name server 28) in its response to that request. Accordingly, with the benefit of the enhanced communications with the DNS name server 28, the DNS client is capable of performing augmented operations such as converging to the active primary authoritative DNS name server of the fault redundant set 36 (i.e., the DNS name server 28(1) of FIG. 1) which is currently capable of processing dynamic DNS updates 40. As a result, the DNS client does not need to waste time and resources converging to the active primary DNS name server as in the earlier-described conventional general approach.

However, if such a request 46 does not exist within the dynamic DNS update 40, the DNS name server 28 receiving that dynamic DNS update 40 concludes that the DNS client that issued that update 40 is not an augmented DNS client (or alternatively is not configured to operate in an augmented manner). In this situation, the DNS name server 28 can operate in a traditional manner (e.g., providing non-augmented responses, acting silent as if the DNS name server 28 is currently not configured to handle dynamic DNS updates 40, etc.). Such operation makes the augmented DNS name servers 28 compatible with legacy DNS clients. Further details will now be provided with reference to FIG. 2.

Figure 2:
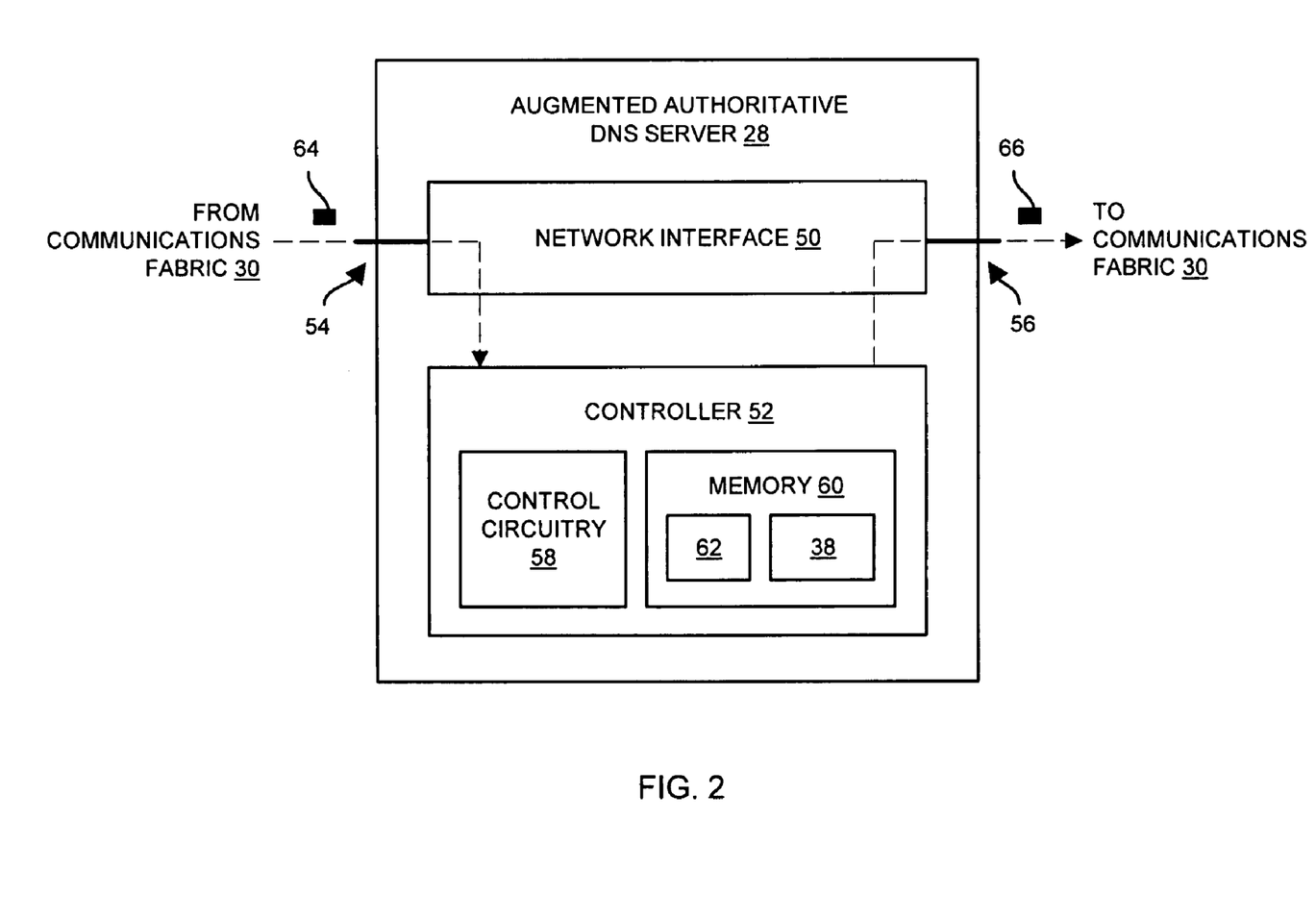
FIG. 2 is a block diagram of a DNS server of the system of FIG. 1.

FIG. 2 shows a detailed view of an augmented DNS name server 28 of the system 20. As shown, the DNS name server 28 includes a network interface 50 and a controller 52. The network interface 50 includes an input 54 configured to receive signals from the communications fabric 30, and an output 56 configured to output signals to the communications fabric 30 (also see FIG. 1).

The controller 52 includes control circuitry 58 (e.g., a set of processors running a set of programs, application specific integrated circuitry, field programmable gate arrays, etc.) configured to perform augmented DNS operations, and memory 60 configured to store copies 38 of zone files as well as other memory constructs 62 (e.g., an operating system, configuration information, network security and authentication information, and so on).

During operation, the controller 52 is configured to receive DNS client messages 64 (e.g., see the dynamic DNS updates 40 and DNS queries 42 in FIG. 1) through the input 54, and provide DNS server messages 66 through the output 56 in response to the DNS client messages 64. The controller 52 selectively provides or does not provide current state information (e.g., the current operating state of the DNS server 28) based on whether the DNS client messages 64 include requests to delete specific records. Further details will now be provided with reference to FIG. 3.

Figure 3:
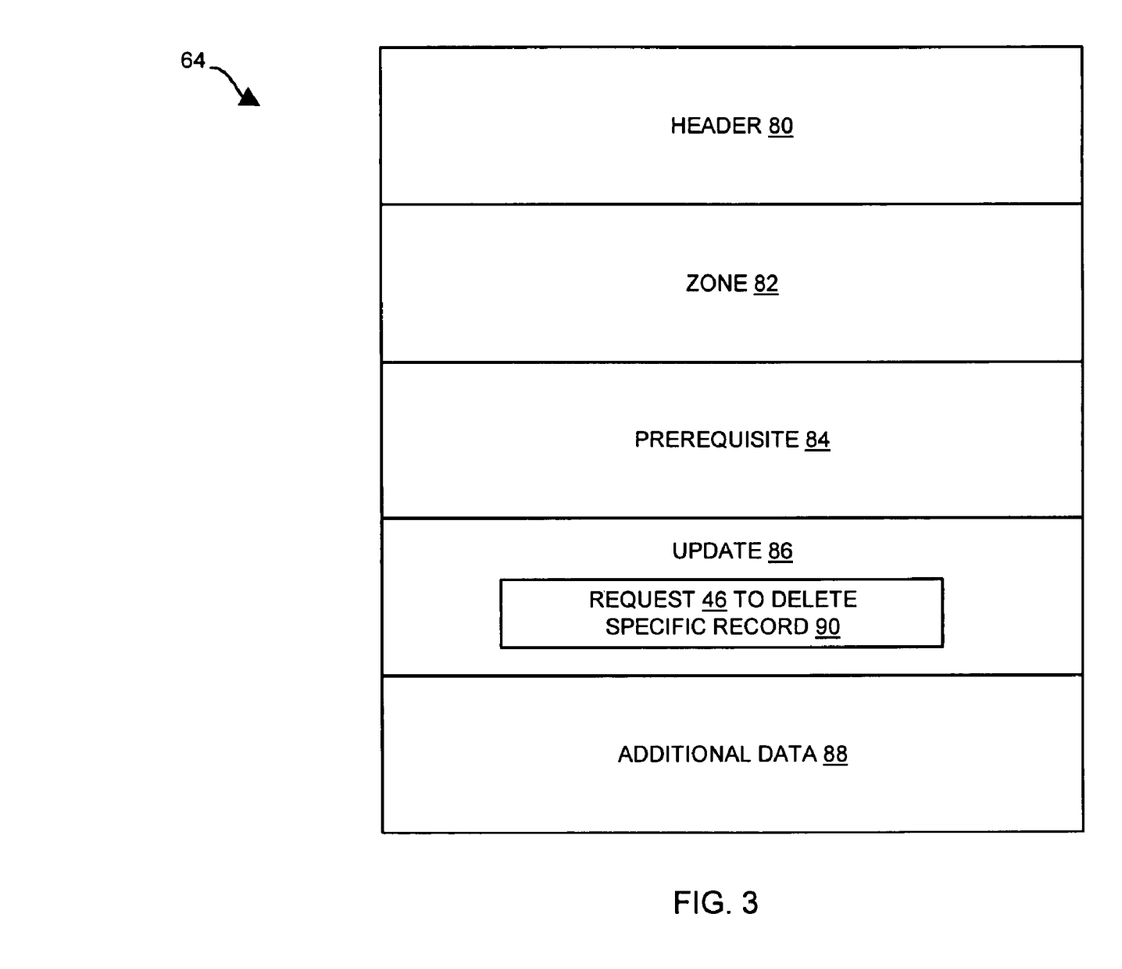
FIG. 3 is a block diagram of a DNS client message sent by a DNS client to the DNS server of FIG. 2.

FIG. 3 is a block diagram of a DNS client message 64 sent by an augmented DNS client (e.g., one of the DHCP servers 24 in FIG. 1) to a DNS name server 28. The DNS client message 64 includes a header field 80, a zone field 82, a prerequisite field 84, an update field 86 and an additional data field 88. The format of the DNS client message 64 is similar to the standard format for a DNS message as described in RFC 2136, the teachings of which have been incorporated by reference. In particular, the header field 80 is a section configured to identify the DNS message as an update message, the zone field 82 is a section configured to denote a zone of records being updated, the prerequisite field 84 is a section configured to contain a set of prerequisites which must be satisfied upon receipt of the DNS message. Further information on the standard uses of the header field 80, the zone field 82, the prerequisite field 84, and the additional data field 88 in the context of a request can be obtained from RFC 2136.

In contrast to conventional dynamic DNS updates, the update field 86 of the DNS client message 64 includes a request 46 to delete a specific record 90, i.e., a request 46 to delete a resource record (RR) that does not currently exist within an identified zone file 38 managed by the DNS name server 28. In particular, the specific record 90 is a specific, predefined record (i.e., a predetermined unique record) which is not expected to exist in the DNS. In some arrangements, the request 46 takes the form of a single specific RR to be deleted. In other arrangements, the request 46 takes the form of a specific resource record set (RRset) to be deleted. In the context of a specific RRset, particular RDATA within the additional data field 88 of the request 46 provides an additional safeguard (i.e., a double check) so that real RR information is not inadvertently deleted.

In some arrangements, the control circuitry 58 of the DNS name server 28 (FIG. 2) is configured to compare parameters of each record of the update section to a predefined NAME value, a predefined TYPE value, a predefined CLASS value, and a specific data value to determine whether the update field 86 includes the command to delete the specific predefined RR 90 from a specific predefined RRset. Accordingly, the control circuitry 58 only provides an augmented response if it precisely detects a request 46 to delete a predetermined unique specific record 90. If such a request 46 is not detected, the control circuitry 58 provides a conventional response.

At this point, it should be understood that RFC 2136 imposes a requirement that the contents of the update field 86 identify RRs or RRsets to be added or deleted. RFC 2136 further indicates in paragraphs 2.5.2 and 2.5.4 that if the contents identify an RR or an RRset and if no such RR or RRset exists, the update operation relating to that particular RR or RRset should be silently ignored by the primary authoritative DNS name server.

Based on the above-referenced requirements imposed by RFC 2136, if the DNS client message 64 of FIG. 2 is sent from an augmented DNS client (e.g., a DHCP server 24 outputting a dynamic DNS update 40) to a conventional primary authoritative DNS name server, the conventional primary authoritative DNS name server will silently ignore the request 46 to delete a specific record 90 within the DNS client message 64 thus making the operation of the augmented DNS client compatible with legacy primary authoritative DNS name server. However, if the DNS client message 64 is sent from an augmented DNS client to an augmented DNS name server 28 (FIG. 2), the augmented DNS name server 28 will find the request 46 to delete a specific record 90 within the DNS client message 64 and thus respond to the DNS client message 64 in an enhanced manner (e.g., with current state information). Further details will now be provided with reference to FIG. 4.

Figure 4:
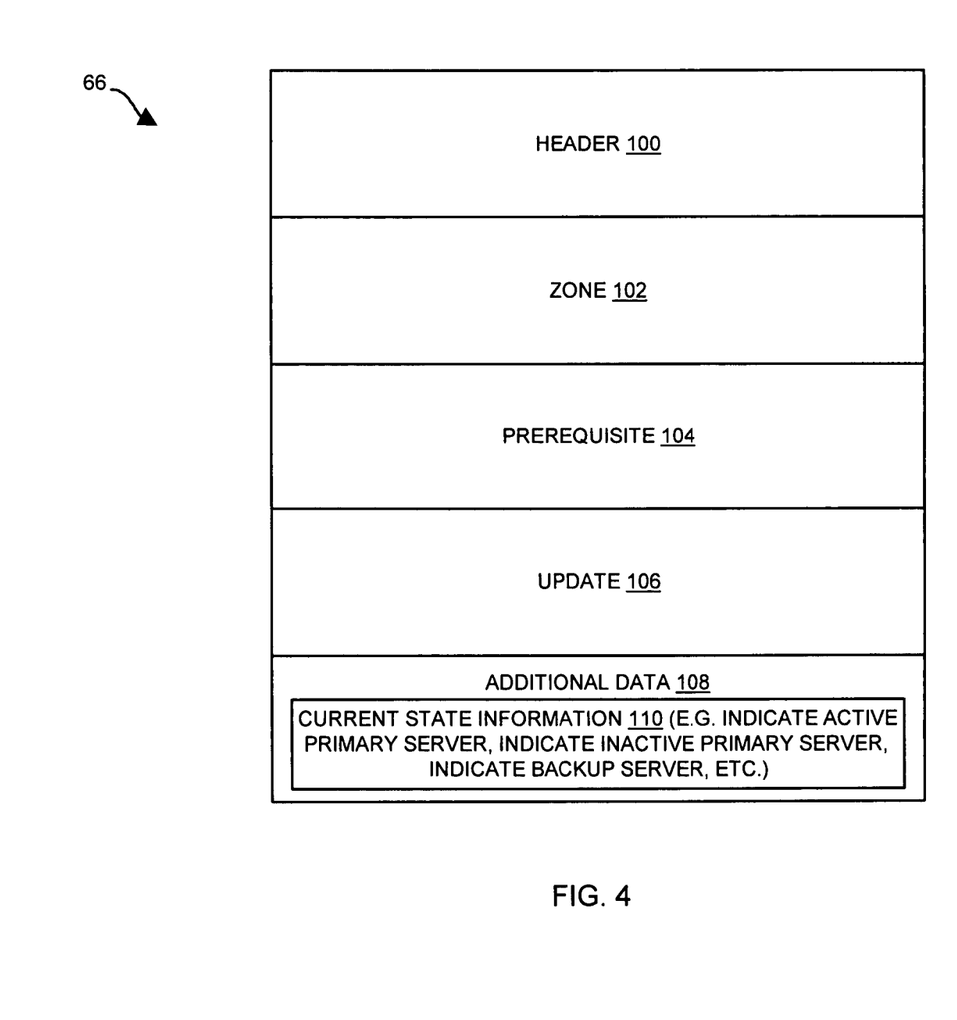
FIG. 4 is a block diagram of a DNS server message sent by the DNS server of FIG. 2 to the DNS client.

FIG. 4 is a block diagram of a DNS server message 66 sent by an augmented DNS name server 28 to an augmented DNS client (e.g., a DHCP server 24 in FIG. 1). The DNS server message 66 includes a header field 100, a zone field 102, a prerequisite field 104, an update field 106 and an additional data field 108. Again, the format of the DNS server message 66 is similar to the standard format for a DNS message as described in RFC 2136, the teachings of which have been incorporated by reference. The header field 100, the zone field 102, and the prerequisite field 104 operate in manners similar to those described above in connection with the DNS client message 64. Further information on the standard uses of the header field 100, the zone field 102, the prerequisite field 104, and the additional data field 108 in the context of a response can be obtained from RFC 2136.

In contrast to conventional responsive DNS messages, the additional data field 108 of the DNS server message 66 includes current state information 110, i.e., an identifier indicating a current operating state of the augmented DNS name server 28. For example, if the augmented DNS name server 28 is designated to operate as the active primary authoritative DNS name server but for some reason is "inactive" (e.g., the augmented DNS name server 28 is currently synchronizing a zone file 38 with a backup DNS name server), the current state information can identify this status to the augmented DNS client to facilitate the operation of DNS client (e.g., the augmented DNS client can plan to re-send a DNS client message 64 (FIG. 3) at a later time rather than waste further resources.

Examples of current state information which is capable of being conveyed are provided below. Suppose that the fault tolerant set 34 of primary authoritative DNS name server includes the DNS server 28(1) which currently operates as the active primary authoritative DNS name server and the DNS server 28(2) which currently operates as a backup primary authoritative DNS name server. Initially, suppose that both DNS name servers 28 are operational in that they are both configured to respond to DNS queries with the active primary authoritative DNS name server being further configured to respond to dynamic DNS updates, i.e., the active primary authoritative DNS name server is configured to make changes to the authoritative copy 38(1) of the master file (FIG. 1). Further suppose that the DNS name server 28(1) then experiences a failure which causes the DNS name server 28(1) to no longer operate (e.g., a power supply failure). At this point, the DNS name server 28(2) detects the loss of the DNS name server 28(1) and then enables itself to respond to DNS queries as it did before, as well as respond to dynamic DNS updates.

Accordingly, the master file copy 38(2) maintained by the DNS name server 28(2) is now the most current version of the master file (also see FIG. 1).

Once the DNS name server 28(1) returns to operation, the DNS name server 28(1) synchronizes its master file copy 38(1) with the master file copy 38(2) maintained by the DNS name server 28(2). During such synchronization, both of the DNS name servers 28(1), 28(2) are deemed to be "inactive", i.e., unavailable to process a dynamic DNS update. However, if the DNS name server 28(1) receives an augmented dynamic DNS update 40 (e.g., see the DNS client message 64 in FIG. 3), the DNS name server 28(1) knows that the source of the dynamic DNS update 40 is an augmented DNS client. Accordingly, rather than ignore the augmented dynamic DNS update 40 as in conventional processing of a dynamic DNS update, the DNS server name 28(1) sends a DNS server message 66 (FIG. 4) to the augmented DNS client indicating that the DNS name server 28(1) is currently configured to operate as an active primary authoritative DNS name server and that the DNS client should re-send the DNS client message 64 to the DNS name server 28(1) after a predetermined amount of time has passed (e.g., an amount of time preset by a network administrator to enable the DNS server to become available again before resending). As a result, the DNS client can proceed onto other work while waiting the predetermined amount of time rather than wasting further resources retrying in the meantime.

Similarly, if the DNS name server 28(2) receives an augmented dynamic DNS update 40 while the DNS name server 28(2) is synchronizing the backup copy 38(2) of the master file with the authentication copy 38(1), the DNS name server 28(2) also knows that the source of the dynamic DNS update 40 is an augmented DNS client. Accordingly, rather than ignore the augmented dynamic DNS update 40 as in conventional processing of a dynamic DNS update, the DNS name server 28(2) sends a DNS server message 66 to the augmented DNS client indicating that the DNS name server 28(2) is currently configured to operate as a backup primary authoritative DNS name server (currently unavailable) and that the DNS client should re-send the DNS client message 64 to a different DNS server 28 (i.e., the DNS name server 28(1)) after a predetermined amount of time has passed. As a result, the DNS client can proceed onto other work while waiting the predetermined amount of time rather than wasting further resources retrying in the meantime.

Furthermore, if the DNS name server 28(1) receives an augmented dynamic DNS update 40 while operating as an active primary authoritative DNS name server, the DNS server 28(1) will detect that the source of the dynamic DNS update 40 is an augmented DNS client and can provide an indication that the DNS name server 28(1) is currently configured to operate as the active primary authoritative name server and that the DNS server has properly processed the dynamic DNS update 40. As a result of the various state information that the augmented DNS name servers 28 are capable of providing, the augmented DNS client more efficiently and more quickly converges to the active primary authoritative DNS name server. Further details will now be provided with reference to FIG. 5.

Figure 5:
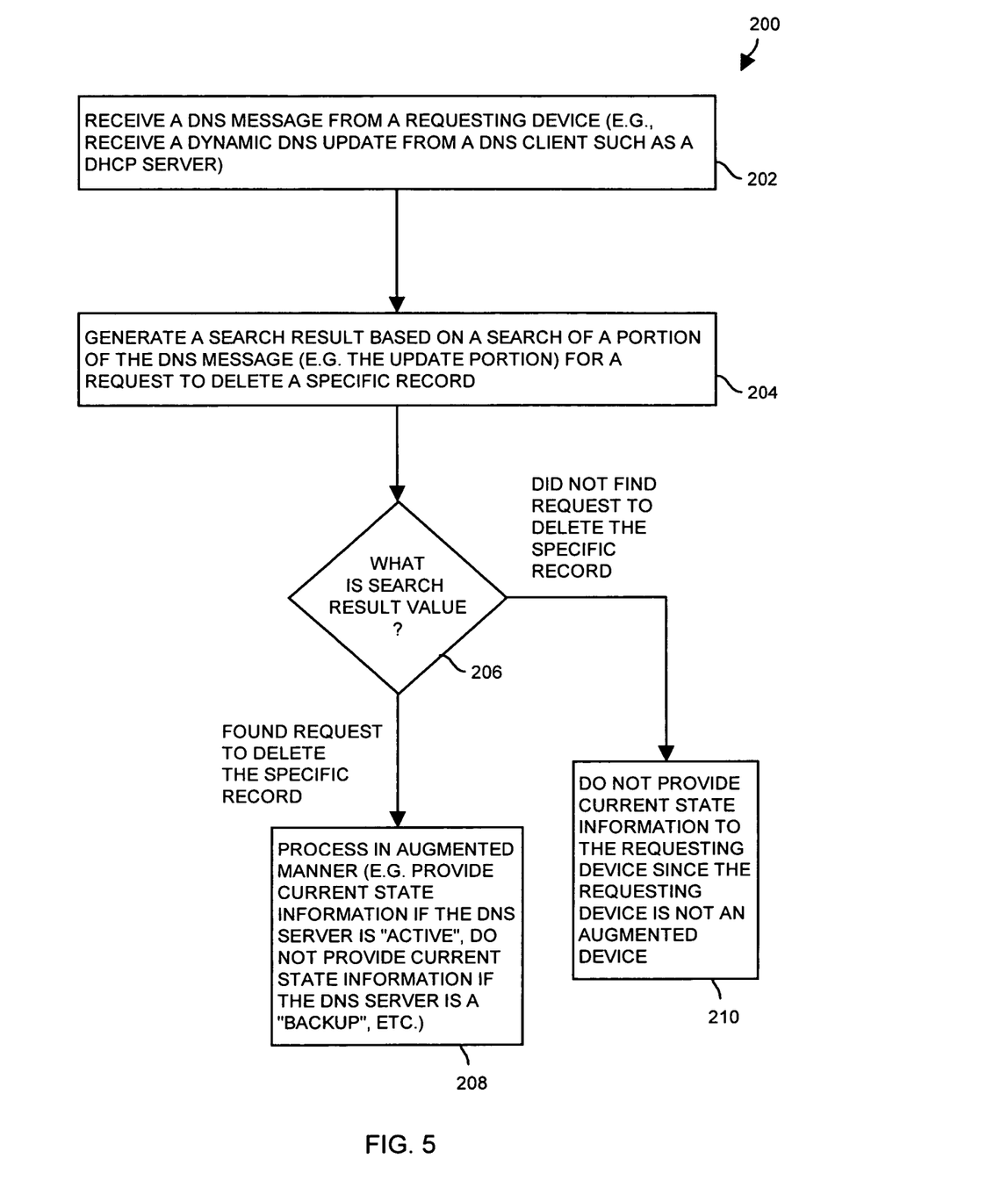
FIG. 5 is a flowchart of a procedure which is performed by the DNS server of FIG. 2.

FIG. 5 is a flowchart of a procedure 200 which is performed by each augmented DNS name server 28 when processing a DNS message 64 (also see FIG. 3). In step 202, the controller 52 of the augmented DNS name server 28 receives the DNS message 64 from a requesting DNS client device. For example, one of the DHCP name servers 24 (FIG. 1) may operate as a DNS client by providing a dynamic DNS update 40 to the DNS name server 28 due to a new DHCP client address assignment.

In step 204, the controller 52 generates a search result based on a search of a portion of the DNS message 64 for a request 46 to delete a specific record 90 (e.g., see the update portion 86 in FIG. 3). In one arrangement, the search result has a first value if such a request 46 is found within the DNS message 64, and a different value if such a request 46 is not found within the DNS message 64.

In step 206, the controller 52 determines whether the requesting DNS device is augmented or not augmented based on the result, and then either provides or does not provide current state information to the requesting DNS client device depending on whether the search result indicates that the request 46 to delete the specific record 90 resides within the portion of the DNS message 64. In particular, if the search result indicates that the controller 52 found a request to delete a specific record, the controller 52 proceeds from step 206 to step 208.

In step 208, the controller 52 outputs a DNS server message 66 (FIG. 4) containing current state information since the requesting DNS client device is augmented. Such information enables the requesting DNS client device to more quickly converge on the active primary authoritative DNS name server of the multiple DNS name servers 28 (FIG. 1). It should be understood that the controller 52 may indicate that it did not perform a DNS update (e.g., if the DNS name server 28 is not available), but nevertheless provides the current state information.

On the other hand, if the search result indicates that the controller 52 did not find a request to delete a specific record, the controller 52 proceeds from step 206 to step 210. In step 210, the controller 52 responds in a conventional manner (e.g., reply to the DNS message without any augmented state data) since the requesting DNS client device is not augmented.

As mentioned above, embodiments are directed to improved techniques for responding to an augmented DNS message 64 from a requesting device. Such techniques involve the use of a request 46 to delete a specific record 90. In particular, an augmented requesting device 24 (e.g., an augmented DNS client) can send such a DNS message 64 to an augmented DNS name server 28 as a means of informing the DNS name server 28 that the requesting device is augmented with the ability to receive current state information from the DNS name server 28. Upon detection of a request 46 to delete a specific record 90 within the DNS message 64, the DNS name server 28 can respond with a variety of current state information, e.g., an indication that the DNS name server is the active primary authoritative DNS name server but is in the process of synchronizing, an indication that the DNS name server is a backup primary authoritative DNS name server rather than the active primary authoritative DNS name server, and so on. Accordingly, the DNS name server 28 can inform the requesting device as to which DNS name server 28 is currently handling dynamic DNS updates 40 thus enabling the requesting device to converge to the proper authoritative DNS name server quickly and efficiently. Moreover, such operation remains compliant with legacy devices, i.e., DNS messages 64 that include a request 46 to delete a specific record 90 can be processed by a conventional DNS name server (e.g., a non-augmented primary authoritative DNS name server) without impacting the operation of that conventional DNS name server since conventional DNS name servers are typically configured to ignore such a request. Furthermore, any non-augmented DNS messages that do not include a request to delete a specific record can be processed by an augmented DNS server 28 in a conventional manner as well.

While this invention has been particularly shown and described with references to preferred embodiments thereof, it will be understood by those skilled in the art that various changes in form and details may be made therein without departing from the spirit and scope of the invention as defined by the appended claims.

For example, the techniques were described above as facilitating information exchange between DNS devices for quicker convergence to the active authoritative DNS name server. The techniques may also be used in other applications. For instance, in other arrangements, the techniques offer a mechanism for an augmented requesting device to inform an augmented receiving device that it is available to receive augmented information. Such features enable the system 20 to essentially carry out an enhanced signaling mechanism that enables a DNS client performing an update to tell the DNS server it is augmented. Thus, the DNS server can then perform whatever augmented operations are defined for it. Moreover, such arrangements enable the augmented devices to properly operate while not interfering with the operation of legacy devices.

Additionally, the additional data portion 88 of the DNS client message 64 (FIG. 3) is capable of including information to facilitate processing by the augmented DNS name servers 28. For example, in some arrangements, the additional data portion 88 (e.g., the RDATA section of the record) contains version information which identifies what version of an augmented protocol runs on the DNS client 22. Such a feature enables the system 20 to support changes in the future.

What is claimed is:

1. A Domain Name System (DNS) server, comprising:
an input;
an output; and
a controller coupled to the input and the output, the controller being configured to:
   receive, through the input, a DNS message from a requesting device,
   generate a search result based on a search of a portion of the DNS message for a request to delete a specific record, and
   selectively provide and not provide, through the output, current state information to the requesting device depending on whether the search result indicates that the request to delete the specific record resides within the portion of the DNS message;
wherein the controller, when generating the search result, is configured to inspect an update section of the DNS message for a request to delete a specific record, the update section being different than (i) a header section configured to identify the DNS message as an update message, (ii) a zone section configured to denote a zone of records being undated; and (iii) a prerequisite section configured to contain a set of prerequisites which must be satisfied upon receipt of the DNS message; and
wherein the controller:
   when inspecting the update section of the DNS message, is configured to output a result signal having a first value when the update section includes a command to delete a predefined resource record from a predefined resource record set and a second value when the update section does not include a command to delete a predefined resource record from a predefined resource record set, the second value being different than the first value; and
   when selectively providing and not providing, through the output, current state information to the requesting device, is configured to:

if the result signal has the first value, then send a reply message to the requesting device in response to the DNS message, the reply message including current state information; and if the result signal has the second value, then send a reply message to the requesting device in response to the DNS message, the reply message being without the current state information; and wherein the command to delete a predefined resource record is a command to delete a specific resource record which is not expected to exist in the DNS.

2. A DNS server as in claim 1 wherein the controller, when inspecting the update section of the DNS message, is further configured to:

compare parameters of each record of the update section to a predefined NAME value, a predefined TYPE value, a predefined CLASS value to determine whether the update section includes the command to delete the predefined resource record from the predefined resource record set.

3. A DNS server as in claim 1 wherein the controller, when selectively providing and not providing the current state information, is configured to:

send a reply message to the requesting device in response to the DNS message when the search result indicates that the request to delete the specific record does not reside within the portion of the DNS message, the reply being without the current state information.

4. A DNS server as in claim 1 wherein the requesting device is a Dynamic Host Configuration Protocol (DHCP) server; and wherein the controller, when selectively providing and not providing the current state information, is configured to:

send a response to the DHCP server when the search result indicates that the request to delete the specific record resides within the portion of the DNS message to indicate to the DHCP server that the DNS server is an augmented authoritative server, the response identifying whether the DNS server is currently configured to operate as (i) an active authoritative server, (ii) an inactive authoritative server, or (ii) a backup authoritative server.

5. A DNS server as in claim 4 wherein the DNS server is currently configured to operate as an active authoritative server among multiple authoritative servers; and wherein the controller, when sending the response to the DHCP server, is configured to:

indicate to the DHCP server that the DNS server is currently configured to operate as the active authoritative server and that the DNS server has processed the DNS message from the DHCP server.

6. A DNS server as in claim 4 wherein the DNS server is currently configured to operate as an inactive authoritative server among multiple authoritative servers; and wherein the controller, when sending the response to the DHCP server, is configured to:

indicate to the DHCP server that the DNS server is currently configured to operate as an inactive authoritative server and that the DHCP server should re-send the DNS message to the DNS server after a predetermined amount of time has passed.

7. A DNS server as in claim 4 wherein the DNS server is currently configured to operate as a backup authoritative server among multiple authoritative servers; and wherein the controller, when sending the response to the DHCP server, is configured to:

indicate to the DHCP server that the DNS server is currently configured to operate as a backup authoritative server and that the DHCP server should re-send the DNS message to a different DNS server.

8. A DNS server as in claim 4 wherein the controller, when sending the response to the DHCP server, is configured to:

when the DNS server is currently configured to operate as an active authoritative server among multiple authoritative servers, indicate to the DHCP server that the DNS server is currently configured to operate as the active authoritative server and that the DNS server has processed the DNS message from the DHCP server;

when the DNS server is currently configured to operate as an inactive authoritative server among multiple authoritative servers, indicate to the DHCP server that the DNS server is currently configured to operate as an inactive authoritative server and that the DHCP server should re-send the DNS message to the DNS server after a predetermined amount of time has passed; and when the DNS server is currently configured to operate as a backup authoritative server among multiple authoritative servers, indicate to the DHCP server that the DNS server is currently configured to operate as a backup authoritative server and that the DHCP server should re-send the DNS message to a different DNS server.

9. In a Domain Name System (DNS) server, a method for responding to a DNS message, the method comprising:

receiving the DNS message from a requesting device;

generating a search result based on a search of a portion of the DNS message for a request to delete a specific record; and selectively providing and not providing current state information to the requesting device depending on whether the search result indicates that the request to delete the specific record resides within the portion of the DNS message;

wherein generating the search result includes inspecting an update section of the DNS message for a request to delete a specific record, the update section being different than (i) a header section configured to identify the DNS message as an update message, a zone section configured to denote a zone of records being undated; and (iii) a prerequisite section configured to contain a set of prerequisites which must be satisfied upon receipt of the DNS message; and wherein:

inspecting the update section of the DNS message includes outputting a result signal having a first value when the update section includes a command to delete a predefined resource record from a predefined resource record set and a second value when the update section does not include a command to delete a predefined resource record from a predefined resource record set, the second value being different than the first value;

selectively providing and not providing current state information to the requesting device depending on whether the search result indicates that the request to delete the specific record resides within the portion of the DNS message includes:

if the result signal has the first value, then sending a reply message to the requesting device in response to the DNS message, the reply message including current state information; and if the result signal has the second value, then sending a reply message to the requesting device in response to the DNS message, the reply message being without the current state information; and wherein the command to delete a predefined resource record is a command to delete a specific resource record which is not expected to exist in the DNS.

10. A method as in claim 9 wherein inspecting the update section of the DNS message further includes:
comparing parameters of each record of the update section to a predefined NAME value, a predefined TYPE value, a predefined CLASS value to determine whether the update section includes the command to delete the predefined resource record from the predefined resource record set.

11. A method as in claim 9 wherein selectively providing and not providing the current state information includes:
sending a reply message to the requesting device in response to the DNS message when the search result indicates that the request to delete the specific record does not reside within the portion of the DNS message, the reply being without the current state information.

12. A method as in claim 9 wherein the requesting device is a Dynamic Host Configuration Protocol (DHCP) server; and wherein selectively providing and not providing the current state information includes:
sending a response to the DHCP server when the search result indicates that the request to delete the specific record resides within the portion of the DNS message to indicate to the DHCP server that the DNS server is an augmented authoritative server, the response identifying whether the DNS server is currently configured to operate as (i) an active authoritative server, (ii) an inactive authoritative server, or (ii) a backup authoritative server.

13. A method as in claim 12 wherein the DNS server is currently configured to operate as an active authoritative server among multiple authoritative servers; and wherein sending the response to the DHCP server includes:
indicating to the DHCP server that the DNS server is currently configured to operate as the active authoritative server and that the DNS server has processed the DNS message from the DHCP server.

14. A method as in claim 12 wherein the DNS server is currently configured to operate as an inactive authoritative server among multiple authoritative servers; and wherein sending the response to the DHCP server includes:
indicating to the DHCP server that the DNS server is currently configured to operate as an inactive authoritative server and that the DHCP server should re-send the DNS message to the DNS server after a predetermined amount of time has passed.

15. A method as in claim 12 wherein the DNS server is currently configured to operate as a backup authoritative server among multiple authoritative servers; and wherein sending the response to the DHCP server includes:
indicating to the DHCP server that the DNS server is currently configured to operate as a backup authoritative server and that the DHCP server should re-send the DNS message to a different DNS server.

16. A method as in claim 12 wherein sending the response to the DHCP server includes:
when the DNS server is currently configured to operate as an active authoritative server among multiple authoritative servers, indicating to the DHCP server that the DNS server is currently configured to operate as the active authoritative server and that the DNS server has processed the DNS message from the DHCP server;
when the DNS server is currently configured to operate as an inactive authoritative server among multiple authoritative servers, indicating to the DHCP server that the DNS server is currently configured to operate as an inactive authoritative server and that the DHCP server should re-send the DNS message to the DNS server after a predetermined amount of time has passed; and
when the DNS server is currently configured to operate as a backup authoritative server among multiple authoritative servers, indicating to the DHCP server that the DNS server is currently configured to operate as a backup authoritative server and that the DHCP server should re-send the DNS message to a different DNS server.

17. A Domain Name System (DNS) server, comprising:
an input;
an output; and
a controller coupled to the input and the output, the controller including:
means for receiving, through the input, a DNS message from a requesting device,
means for generating a search result based on a search of a portion of the DNS message for a request to delete a specific record, and
means for selectively providing and not providing, through the output, current state information to the requesting device depending on whether the search result indicates that the request to delete the specific record resides within the portion of the DNS message;
wherein the command to delete a predefined resource record is a command to delete a specific resource record which is not expected to exist in the DNS 18. A DNS server as in claim 1 wherein the current state information indicates:
a current operating state of the DNS server, including whether or not the DNS server is currently able to process dynamic DNS updates;
the address of an active primary authoritative DNS server, if the DNS server is not currently configured to operate as an active primary authoritative DNS server; and
an amount of time that the requesting device should wait before sending a dynamic DNS update request, if no DNS server is currently capable of processing dynamic DNS updates.

19. A method as in claim 1 wherein the current state information indicates:
a current operating state of the DNS server, including whether or not the DNS server is currently able to process dynamic DNS updates;
the address of an active primary authoritative DNS server, if the DNS server is not currently configured to operate as an active primary authoritative DNS server; and
an amount of time that the requesting device should wait before sending a dynamic DNS update request, if no DNS server is currently capable of processing dynamic DNS updates.

20. A DNS server as in claim 1 wherein the current state information indicates:
a current operating state of the DNS server, including whether or not the DNS server is currently able to process dynamic DNS updates;
the address of an active primary authoritative DNS server, if the DNS server is not currently configured to operate as an active primary authoritative DNS server; and
an amount of time that the requesting device should wait before sending a dynamic DNS update request, if no DNS server is currently capable of processing dynamic DNS updates.

* * * * *

UNITED STATES PATENT AND TRADEMARK OFFICE
CERTIFICATE OF CORRECTION

PATENT NO. : 7,680,956 B2
APPLICATION NO. : 11/585560
DATED : March 16, 2010
INVENTOR(S) : Bernard Volz, Sri Hary Vengadasubbu and Jeffrey Cioli It is certified that error appears in the above-identified patent and that said Letters Patent is hereby corrected as shown below:

Claim 9, Column 12, Lines 35-43, wherein generating the search result includes inspecting an update section of the DNS message for a request to delete a specific record, the update section being different than (i) a header section configured to identify the DNS message as an update message, a zone section configured to denote a zone of records being updated; and (iii) a prerequisite section configured to contain a set of prerequisites which must be satisfied upon receipt of the DNS message; and should read -- wherein generating the search result includes inspecting an update section of the DNS message for a request to delete a specific record, the update section being different than (i) a header section configured to identify the DNS message as an update message, (ii) a zone section configured to denote a zone of records being updated; and (iii) a prerequisite section configured to contain a set of prerequisites which must be satisfied upon receipt of the DNS message; and --.

Signed and Sealed this

Fourth Day of May, 2010

David J. Kappos
*Director of the United States Patent and Trademark Office*